US010425722B2

(12) United States Patent
Toda et al.

(10) Patent No.: US 10,425,722 B2
(45) Date of Patent: Sep. 24, 2019

(54) SOUND SYSTEM FOR VEHICLE

(71) Applicant: Mazda Motor Corporation, Aki-gun, Hiroshima (JP)

(72) Inventors: Isao Toda, Hatsukaichi (JP); Kenji Asada, Higashihiroshima (JP); Katsumasa Sogame, Higashihiroshima (JP); Hironobu Hashiguchi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/971,755

(22) Filed: May 4, 2018

(65) Prior Publication Data

US 2018/0332386 A1 Nov. 15, 2018

(30) Foreign Application Priority Data

May 11, 2017 (JP) ................................ 2017-094621

(51) Int. Cl.
*H04B 1/00* (2006.01)
*H04R 1/32* (2006.01)
(Continued)

(52) U.S. Cl.
CPC ............. *H04R 1/323* (2013.01); *G10K 11/18* (2013.01); *G10K 15/02* (2013.01); *H04S 7/302* (2013.01); *H04R 2499/13* (2013.01)

(58) Field of Classification Search
CPC .... H04R 1/323; H04R 2499/13; G10K 11/18; G10K 15/02; H04S 7/302
(Continued)

(56) References Cited

U.S. PATENT DOCUMENTS

2006/0062411 A1* 3/2006 Sako ....................... H04S 3/002 381/310
2007/0223728 A1* 9/2007 Sakamoto ................ H04S 3/00 381/86
(Continued)

FOREIGN PATENT DOCUMENTS

JP H0585288 A 4/1993
JP 2776092 B2 7/1998
(Continued)

OTHER PUBLICATIONS

European Patent Office, Extended European Office Action Issued in Application No. 18000414.5, dated Oct. 10, 2018, Germany, 10 pages.

*Primary Examiner* — Xu Mei
*Assistant Examiner* — Ammar T Hamid
(74) *Attorney, Agent, or Firm* — Alleman Hall Creasman & Tuttle LLP

(57) ABSTRACT

A sound system for a vehicle is provided, which includes an engine and an audio device for an internal space of a cabin, as sound sources disposed at given positions of the vehicle. The system includes an engine sound localizer configured to localize a first sound generated by the engine to cause a vehicle driver inside the cabin to hear the first sound from a first position, an audio sound localizer configured to localize a second sound generated by the audio device to cause the driver to hear the second sound from a second position, a traveling state detector configured to detect a traveling state of the vehicle, and a controller configured to cause the audio sound localizer to change, when a given traveling state is detected by the traveling state detector, the second position in a direction away from the first position.

11 Claims, 8 Drawing Sheets

(51) Int. Cl.
*G10K 11/18* (2006.01)
*H04S 7/00* (2006.01)
*G10K 15/02* (2006.01)
*H04R 5/02* (2006.01)

(58) Field of Classification Search
USPC .................................................... 381/86, 302
See application file for complete search history.

(56) References Cited

U.S. PATENT DOCUMENTS

| | | | |
|---|---|---|---|
| 2012/0114130 | A1 | 5/2012 | Lovitt |
| 2013/0230185 | A1 | 9/2013 | Osawa et al. |
| 2014/0198933 | A1 | 7/2014 | Totsuka et al. |
| 2017/0008453 | A1 | 1/2017 | Hillers |

FOREIGN PATENT DOCUMENTS

| | | | |
|---|---|---|---|
| JP | 10276500 | A | 10/1998 |
| JP | 2000197199 | A | 7/2000 |
| JP | 2005191668 | A | 7/2005 |
| JP | 2007253772 | A | 10/2007 |
| WO | 2012141325 | A1 | 10/2012 |

* cited by examiner

SOUND SYSTEM FOR VEHICLE

TECHNICAL FIELD

The present disclosure relates to sound systems for vehicles.

BACKGROUND OF THE DISCLOSURE

Vehicles are generally equipped with audio devices that play an audio sound in a cabin. JP2776092B and JP1993-085288A disclose audio devices that perform localization of an audio sound so that a person(s) on board is able to hear the audio sound from a given position in a cabin.

Meanwhile, vehicles which are focused on the enjoyment of traveling, such as sports cars, are required to actively cause person(s) on board, especially a vehicle driver, to hear (listen to) an engine sound. That is, since the engine sound is a good indication of a vehicle state, it becomes an extremely important element in the enjoyment of traveling. Therefore, when the audio device is operating, how to effectively cause the person(s) on board to hear the engine sound while also hearing the audio sound, is important.

SUMMARY OF THE DISCLOSURE

The present disclosure is made in view of the above situations and aims to provide a sound system for a vehicle, which is capable of causing person(s) on board to hear an audio sound while also hearing an engine sound more clearly as needed.

In order to achieve the above aim, according to one aspect of the present disclosure, a sound system for a vehicle is provided, which includes an engine and an audio device for an internal space of a cabin, as sound sources disposed at given positions of the vehicle. The system includes an engine sound localizer configured to localize a first sound generated by the engine to cause a vehicle driver inside the cabin to hear the first sound from a first position, an audio sound localizer configured to localize a second sound generated by the audio device to cause the driver to hear the second sound from a second position, a traveling state detector configured to detect a traveling state of the vehicle, and a controller configured to cause the audio sound localizer to change, when a given traveling state is detected by the traveling state detector, the second position in a direction away from the first position.

According to this structure, since both of the engine sound and the audio sound are localized, the driver is able to hear the engine sound and the audio sound while distinguishing them. When the given traveling state is detected, since the localized position of the audio sound is moved (changed) in a direction away from the localized position of the engine sound, the driver is able to clearly recognize the engine sound (especially, a change thereof) and also a state of the vehicle based on the engine sound.

The given traveling state may be a traveling state where an operation load on a person in the vehicle increases. Thus, the driver is able to recognize the engine sound more clearly when the operation load is high and focus on the vehicle state based on the engine sound, and it is preferable for enhancing safety.

The traveling state where the operation load on the person increases may be a traveling state where an engine speed exceeds a given speed. Thus, in the state where the engine speed increases, the driver is able to focus on the vehicle state based on the engine sound recognized more clearly, and it is preferable for enhancing safety.

The traveling state where the operation load on the person increases may be a traveling state where a g-force acting on the vehicle exceeds a given value. Thus, in the state where the g-force acting on the vehicle increases, the driver is able to focus on the vehicle state based on the engine sound recognized more clearly, and it is preferable for enhancing safety.

The first position may be set forward of a vehicle driver seated on a driver seat. The localized position controller may move the second position downward of the first position. Thus, by moving the localized position of the audio sound lower to make the driver relatively less able to hear the audio sound, the driver is able to focus on the vehicle state based on the engine sound that is recognized more clearly.

The first position may be set forward of a vehicle driver seated on a driver seat. The localized position controller may move the second position toward a front passenger seat side of the first position in width directions of the vehicle. Thus, the driver is able to recognize the engine sound more clearly while the front passenger upon whom no operation load falls is allowed to enjoy the audio sound sufficiently.

DETAILED DESCRIPTION OF THE DISCLOSURE

Figure 1:
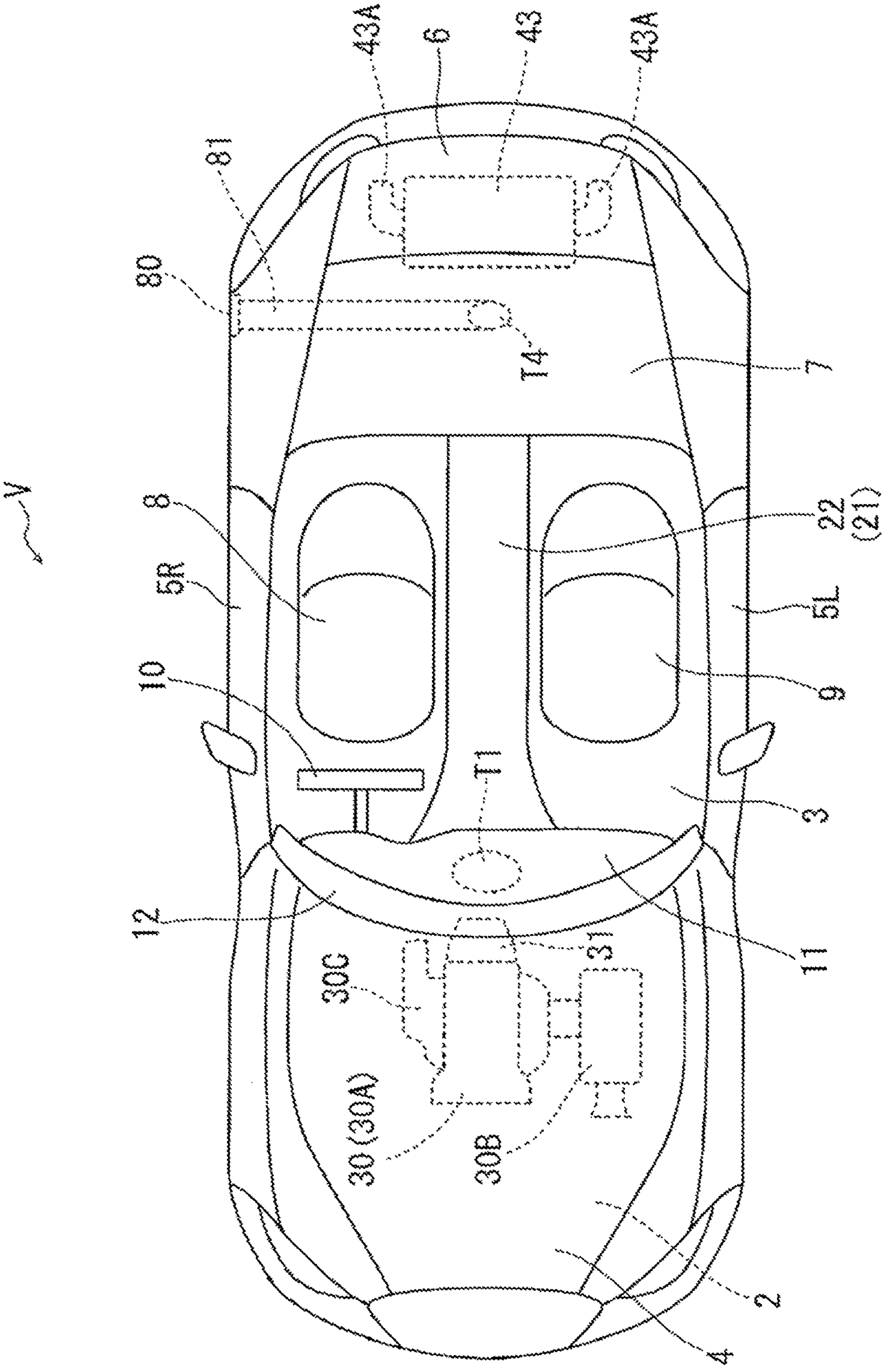
FIG. 1 is a plan view illustrating one example of a vehicle to which the present disclosure is applied.
Figure 2:
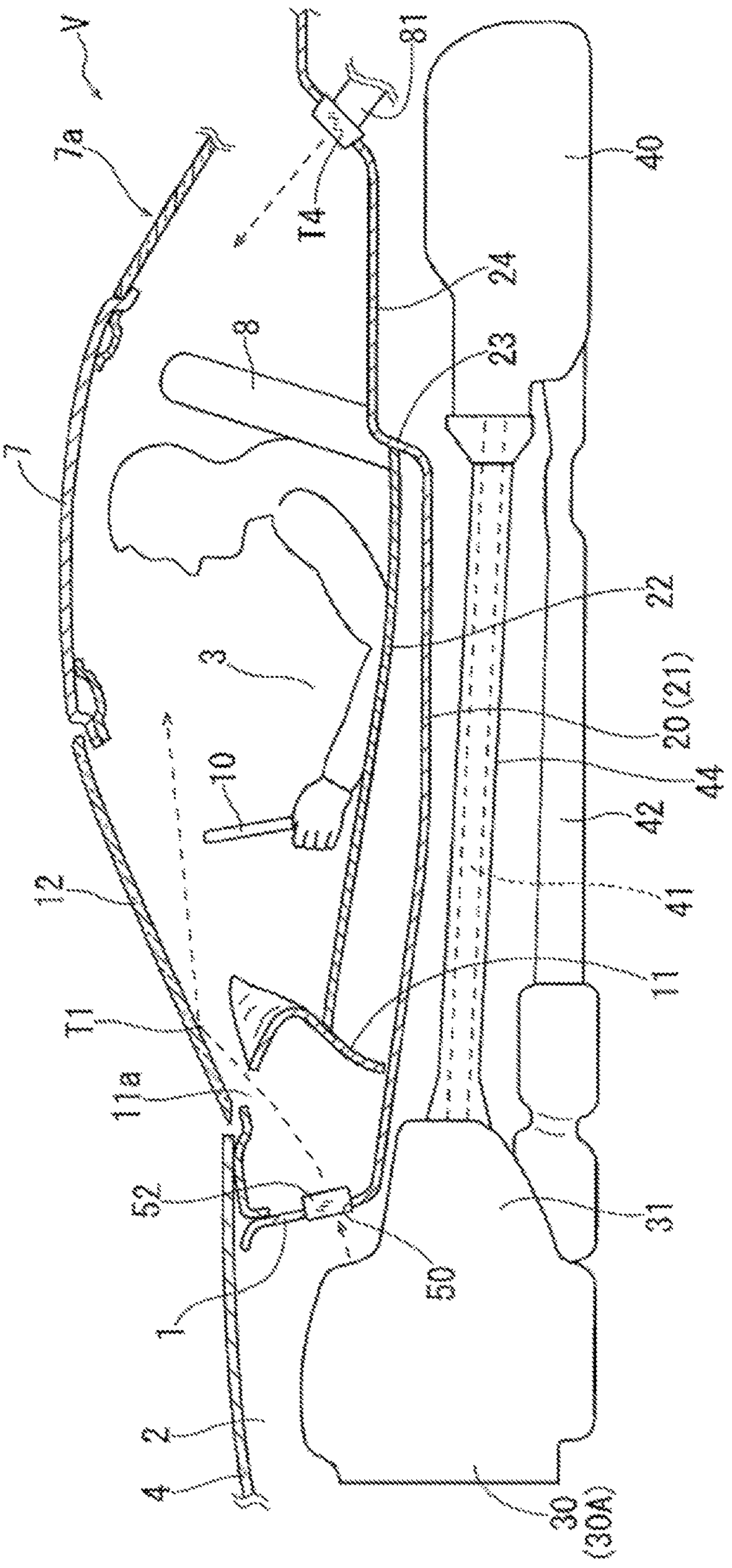
FIG. 2 is a partial cross-sectional side view of the vehicle illustrated in FIG. 1.

In FIGS. 1 and 2, a vehicle V of this embodiment is a two-door convertible. Here, the reference character "1" is a dashboard dividing an engine bay 2 from a cabin 3. The reference character "4" is a hood covering the engine bay 2 from the top thereof, the reference characters "5R" and "5L" are a pair of left and right side-doors, the reference character "6" is a trunk lid, and the reference character "7" is a roof. Further, the reference character "8" is a driver seat, the reference character "9" is a front passenger seat, and the reference character "10" is a steering wheel. Additionally, the reference character "11" is an instrument panel and the reference character "12" is a front windshield.

As illustrated in FIG. 2, the roof 7 has a rear windshield 7*a*. FIG. 2 illustrates a state where the roof 7 is closed, i.e., the top of the cabin 3 is covered by the roof 7. Although FIG. 1 also illustrates the closed roof 7, the roof 7 is seen through and an upper end part of the front windshield 12 is partially cut out for the sake of illustration.

A floor panel 20 constituting a floor surface of the cabin 3 has a tunnel part 21 extending front-and-rear directions (longitudinal directions) of the vehicle in its center part in left-and-right directions (lateral directions, width directions) of the vehicle, and an upper surface of the tunnel part 21 is covered by a trim member 22. A rear end part of the floor panel 20 connects to a rear panel 24 via a kick-up part 23.

The engine bay 2 formed forward of the dashboard 1 is provided with an engine 30. The engine 30 of this embodiment is placed longitudinally. An engine body is denoted with "30A," an intake-system member is denoted with "30B," and an exhaust-system member is denoted with "30C." A transmission 31 is coupled to a rear part of the engine 30 (engine body 30A).

Note that although the engine 30 is equipped with auxiliary equipment, such as an alternator and an air-conditioning compressor which are driven by the engine body 30A, they are not illustrated. An engine sound is a mixture of a sound generated when the engine body 30A rotates or performs combustion, an intake sound, an exhaust sound, and also a sound of the auxiliary equipment being driven.

A differential (differential gear) 40 is disposed in a rear part of the vehicle V. The differential 40 is coupled to the transmission 31 (i.e., the engine 30) via a propeller shaft 41. That is, the vehicle V of this embodiment is a rear-wheel drive vehicle. Further, the transmission 31 and the differential 40 are coupled by an annular-shaped torque tube 44 disposed to wrap around the propeller shaft 41.

An exhaust passage 42 extends rearward from the engine 30. This exhaust passage 42 is connected to a muffler 43 disposed under the rear part of the vehicle. The muffler 43 is connected to a pair of left and right exhaust pipes 43A opening rearward. The exhaust gas is finally discharged outside (to the atmosphere) from the exhaust pipes 43A.

Next, localization of the engine sound and an audio sound will be described. First, as illustrated in FIG. 4, a first position (section or area) to which the engine sound is localized is denoted with the reference character "T1" and a second position to which the audio sound is localized is denoted with the reference character "T2." Additionally, in this embodiment, an alarm sound is localized to a third position T3.

The first to third positions T1 to T3 of this embodiment are individually set to be located forward of a vehicle driver seated at the driver seat 8. That is, the first position T1 is set in the front windshield 12. For example, the first position T1 is set in a center part of the front windshield 12 in the width directions, substantially at the same height as the driver's eyes.

Further, the second position T2 is set at a position lower than the first position T1 by a given distance. For example, the second position T2 is set to be located in a substantially center part of a surface of the instrument panel 11 facing substantially rearward. This second position T2 is set to have a wider area than the first position in the width directions (to cause both the driver and the front passenger hear the audio sound). Note that the first and second positions and T2 are separated from each other by the given distance so that the engine sound and the audio sound are distinguishable from each other, and the given distance is at least 30 cm, more preferably 50 cm or more.

Figure 4:
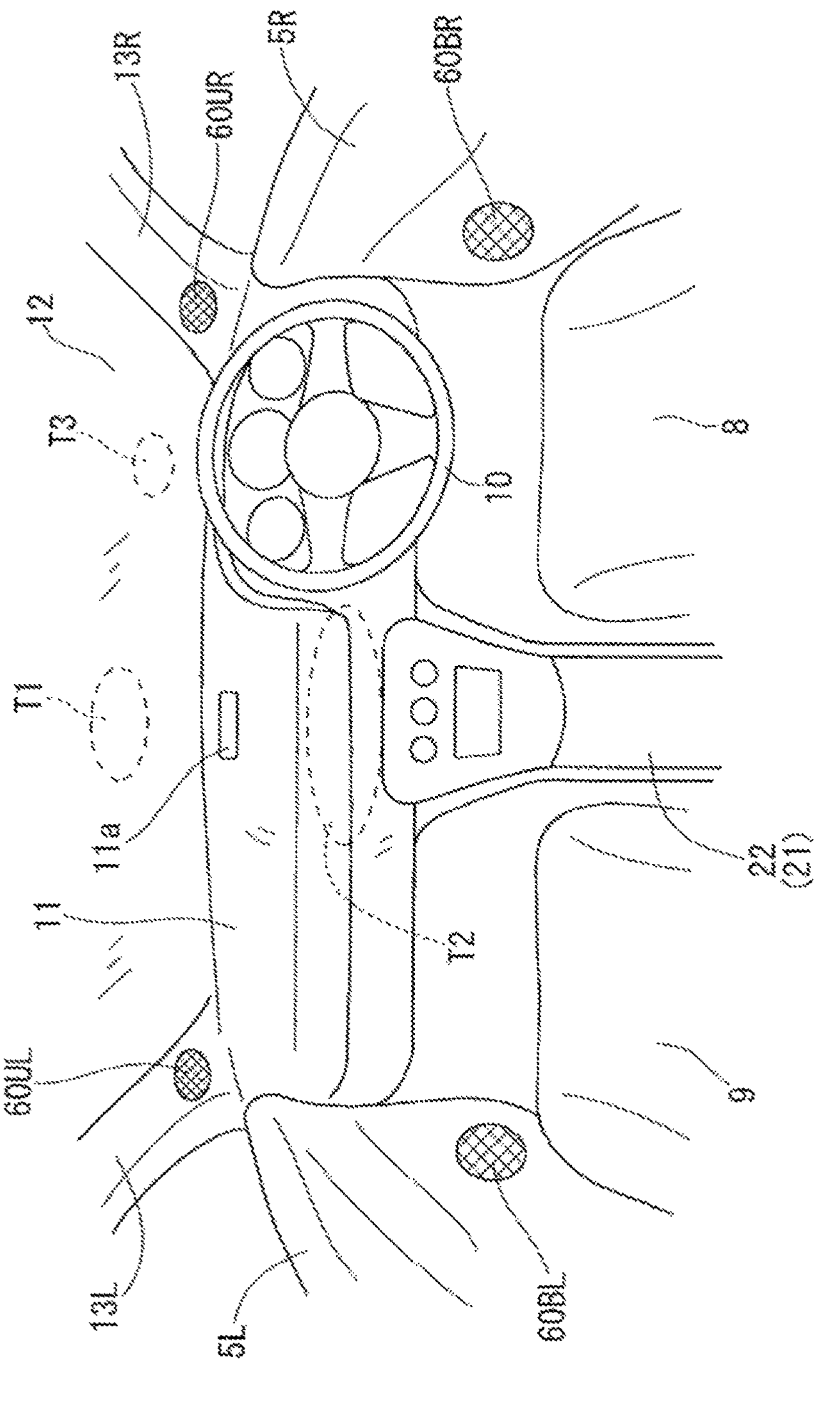
FIG. 4 is an elevational view of a cabin when looking forward from a rear part thereof, illustrating one example of localized positions of an engine sound, an audio sound, and an alarm sound.

The second position T2 illustrated in FIG. 4 indicates the position in a default (basic) state and is located so that a person on board (especially the driver) is able to distinguish the engine sound and the audio sound from each other. This second position T2 is changed according to a preset traveling condition. That is, for example, when an operation load as the traveling condition becomes high, the second position T2 is separated from the first position so that the driver is able to recognize the engine sound more clearly. By separating the first and second positions and T2 from each other, the driver is able to distinguish the engine sound more clearly from the audio sound while still hearing the audio sound.

The state where the operation load becomes high is also considered to be a situation where driving (traveling) is actively performed, for example, when an engine speed is as high as above a given speed, when a g-force (G) which acts on a vehicle body (one or both of lateral acceleration and longitudinal acceleration) is higher than a given value, when traveling on a winding road, when acceleration/deceleration is frequently performed, when a steering operation is frequently performed, when traveling on a mountain road, when traveling on a circuit road, when a vehicle speed is high (e.g., above 80 km/h), etc. Furthermore, a mode switch which is manually controlled by the driver may be provided so that the second position T2 is moved (changed) according to the control of the mode switch.

The separation of the second position T2 from the first position may be performed as follows. That is, the second position T2 is moved downward from the position illustrated in FIG. 4. As the localized position of the audio sound shifts lower, the driver's perception of the audio sound lessens and he/she recognizes the engine sound more clearly. Alternatively, the second position T2 is moved toward the front passenger seat side in the width directions (in FIG. 4, the second position T2 is moved leftward to move away from the driver seat). In another example, the second position T2 is moved obliquely downward to the front passenger seat side. In further another example, the second position T2 may also be moved rearward of the driver seat (e.g., in terms of the longitudinal directions, a position near the kick-up part 23, and in terms of the width directions, substantially a center part, or on the rear side of the front passenger seat).

When a condition for moving the second position T2 from the default position is canceled, the second position T2 may be resumed to the default position illustrated in FIG. 4. The change of the second position T2 between the default position and the position after moved from the default position (moved position) is preferably performed gradually (e.g., over about 3 to 4 seconds) in view of preventing or reducing a sharp change in the hearing. Note that the change from the default position to the moved position may be performed swiftly while the resumption from the moved position to the default position may be performed gradually.

The third position T3 is set to be located in an extension of a driver's line of sight when the driver who is seated on the driver seat 8 looks forward. The third position T3 may be set, for example, in the front windshield 12. Although it may be further forward of the front windshield 12, it is more preferably set at a position at which information is presented to the driver by a head-up display.

Note that the areas of the localized positions T1, T2, and T3 are not limited to those illustrated and may be, for example, wider areas in the width directions and/or up-and-down directions of the vehicle. The position of may be variable within the front windshield 12 according to the vehicle state, such as a steering angle.

Next, a specific structural example in which the engine sound is localized to the first position will be described. First, as illustrated in FIG. 3, the dashboard 1 is formed with an opening 50 at a position equivalent to that of the engine 30 (engine body 30A) in height (up-and-down directions)

and in the width directions. This opening 50 communicates the engine bay 2 with the inside of (a space formed by) the instrument panel 11. Further, the opening 50 is covered by a film member 51 that blocks air and liquid. Thus, the engine sound from the engine bay 2 is effectively transmitted into the instrument panel 11 by vibrating the film member 51.

The instrument panel 11 is formed with an opening 11*a* in its upper surface (see FIG. 2). The engine sound transmitted into the instrument panel 11 is further transmitted toward the front windshield 12 through the opening 11*a* and reflects on the front windshield 12 to be transmitted to the driver seated on the driver seat 8. Thus, the first position is a section where the engine sound reflects on the front windshield 12. Air and liquid in the engine bay 2 are prevented from flowing into the cabin 3 by being sealed by the film member 51.

Figure 3:
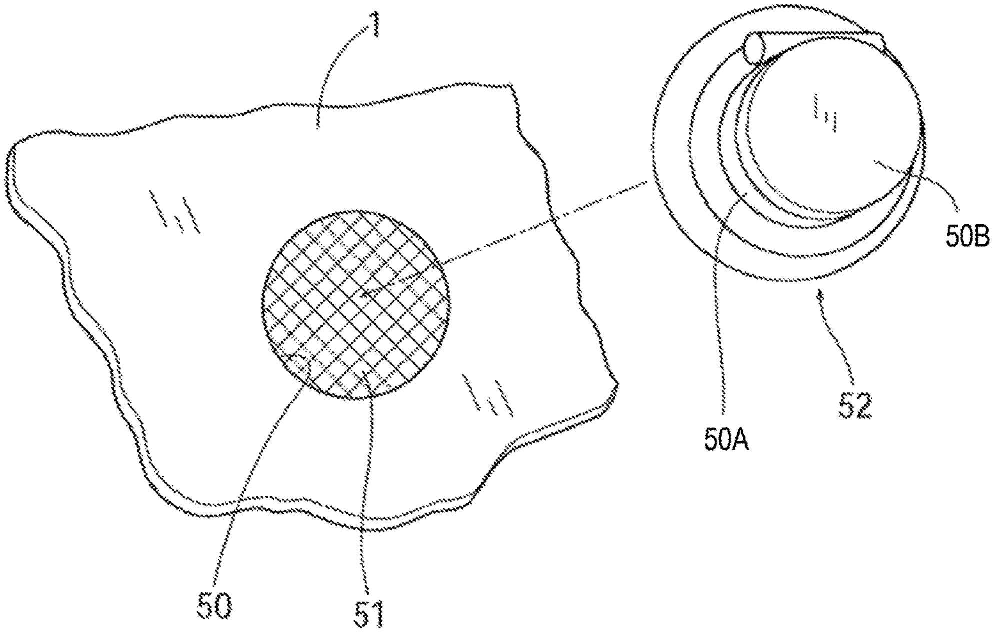
FIG. 3 is an exploded perspective view illustrating a structure of an engine sound transparent section formed in a dashboard.

As illustrated in FIG. 3, the opening 50 covered by the film member 51 is attached with a valve member 52. The valve member 52 has a short cylindrical member 50A extending to the opening 50 and an electromagnetic valve body 50B that opens and closes the cylindrical member 50A. In this embodiment, the valve member 52 is normally fully opened so that the engine sound from the opening 50 is normally transmitted into the instrument panel 11 through the cylindrical member 50A. Note that the opening of the valve member 52 may be changeable according to a traveling state of the vehicle (e.g., the opening of the valve member 52 is increased as the engine sound or a vehicle speed increases). Any one or more of the components constituting the above-described structure that localizes the engine sound to the first position may be referred to as the engine sound localizer.

For the localization of the audio sound to the second position T2, in this embodiment, as illustrated in FIG. 4, a total of four speakers, upper left and right speakers 60UL and 60UR and lower left and right speakers 60BL and 60BR are provided. The pair of upper left and right speakers 60UL and 60UR are full-range tweeter speakers and are attached to left and right front pillars 13L and 13R, respectively. The pair of lower left and right speakers 60BL and 60BR are also full-range tweeter speakers and attached to the left and right side doors 5L and 5R, respectively.

By using the four speakers 60UL, 60UR, 60BL, and 60BR, the audio sound is localized so as to be hearable from the second position T2 in a manner of known time alignment. Further, the second position T2 may be moved from the position illustrated in FIG. 4 to a desired position, such as downward, leftward (in one the of the width directions which is away from the driver seat 8 and approaches the front passenger seat 9), downward to the left (an oblique direction corresponding to a movement for separating from the driver seat 8 in the width directions while moving downward) or rearward of the driver seat, in the manner of known time alignment. Any one or more of the components constituting the above-described structure that localizes the audio sound to the second position T2 may be referred to as the audio sound localizer. One known method of localization through time alignment includes using a digital sound processor (DSP) such as DSP 70 described below with an appropriate algorithm. The DSP controls the phase and magnitude of the sound waves emitted by each speaker to align in such a way that some waves cancel each other out at certain locations where sound is not desired, and other waves are summed into a stronger wave at other locations where sound is desired. Using these techniques, the DSP 70 may process the audio signal for sounds emitted through each speaker to cause the perceived position of the sound to vary within the cabin of the vehicle.

Further, by using the four speakers 60UL, 60UR, 60BL, and 60BR, the alarm sound is localized so as to be hearable from the third position T3 in the manner of known time alignment. Thus, the alarm sound is superimposed on the audio sound and transmitted from the speakers 60UL, 60UR, 60BL, and 60BR. Any one or more of the components constituting the above-described structure that localizes the alarm sound to the third position T3 may be referred to as the alarm sound localizer.

Figure 5:
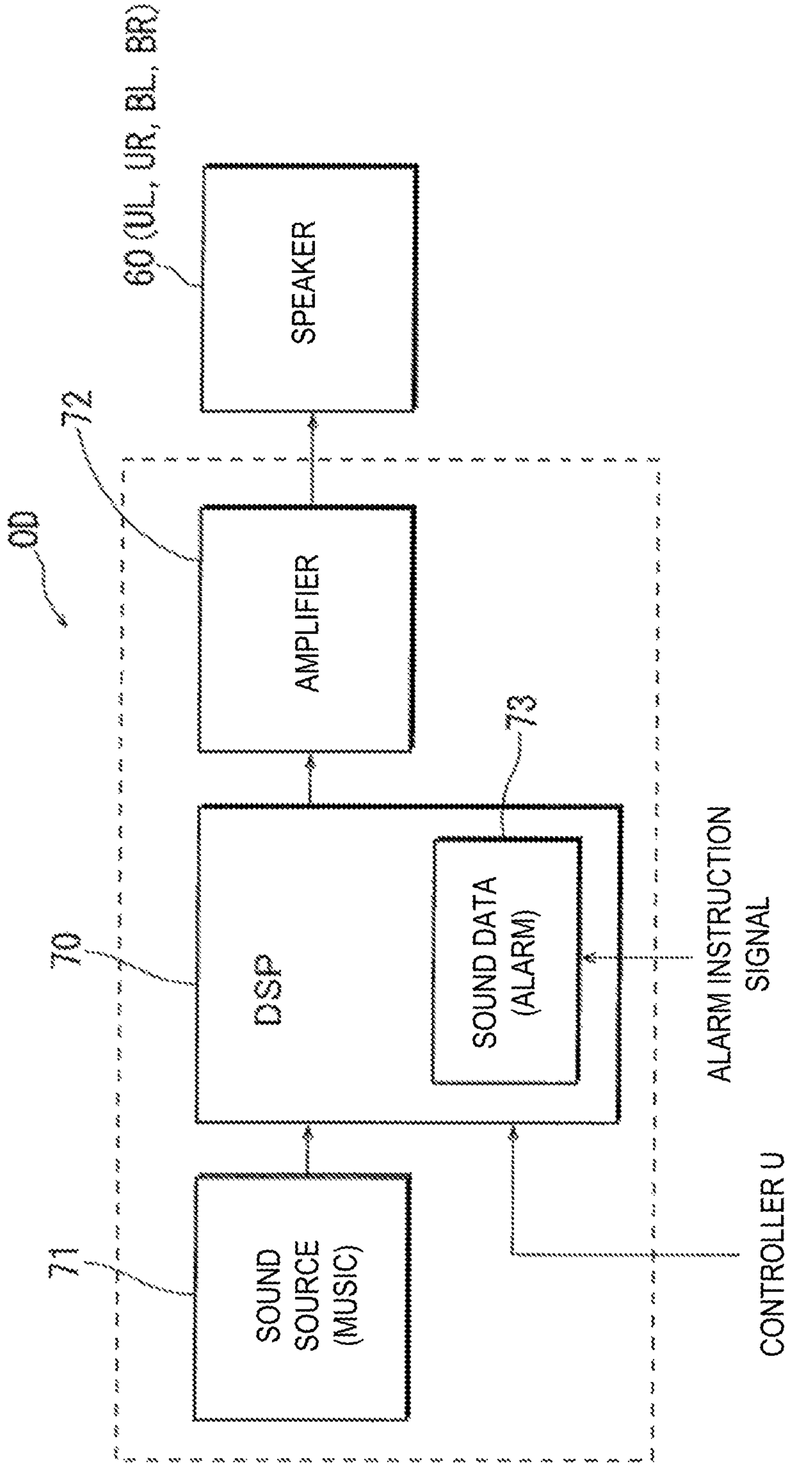
FIG. 5 is a block diagram illustrating one example of a control system of an audio device.

FIG. 5 illustrates one example of an audio device OD. In FIG. 5, the reference character "70" is a DSP. Once this DSP 70 receives a signal from a sound source 71 for audio, it performs the processing of time alignment described above so that the audio sound is localized to the second position T2, and drives the speakers 60UL, 60UR, 60BL, and 60BR via an amplifier 72. Furthermore, a control for moving the second position T2 according to an instruction signal from a controller U described later is performed. The controller U may be referred to as the localized position controller.

The DSP 70 has a storage (memory) 73 storing alarm sound data (a model). Once the DSP 70 receives an instruction signal for issuing an alarm, it performs the processing of time alignment described above so that the alarm sound is localized to the third position T3, and drives the speakers 60UL, 60UR, 60BL, and 60BR via the amplifier 72.

In this embodiment, the exhaust sound is also localized. That is, a fourth position T4 where the driver is able to hear the exhaust sound is set in a substantially center part of a rear part of the cabin in the width directions (see FIGS. 1 and 2). This fourth position T4 is located at a structure in which a valve member is disposed at an opening leading into the cabin and has substantially the same structure as that illustrated in FIG. 3, and therefore the redundant description is omitted.

The fourth position T4 (the opening of the structure) is connected via a duct 81 with an extra chamber 80 opened to the outside and for ventilating air inside the cabin (see FIGS. 1 and 2). Since the extra chamber 80 is formed near the exhaust pipe 43A, the exhaust sound may effectively be transmitted to the fourth position T4. Note that the valve member at the fourth position T4 may normally be fully opened, or it may be closed when sports driving is not expected, such as when traveling in an urban area or at a low vehicle speed. Moreover, the opening of this valve member may gradually be increased as an engine speed increases.

Figure 6:
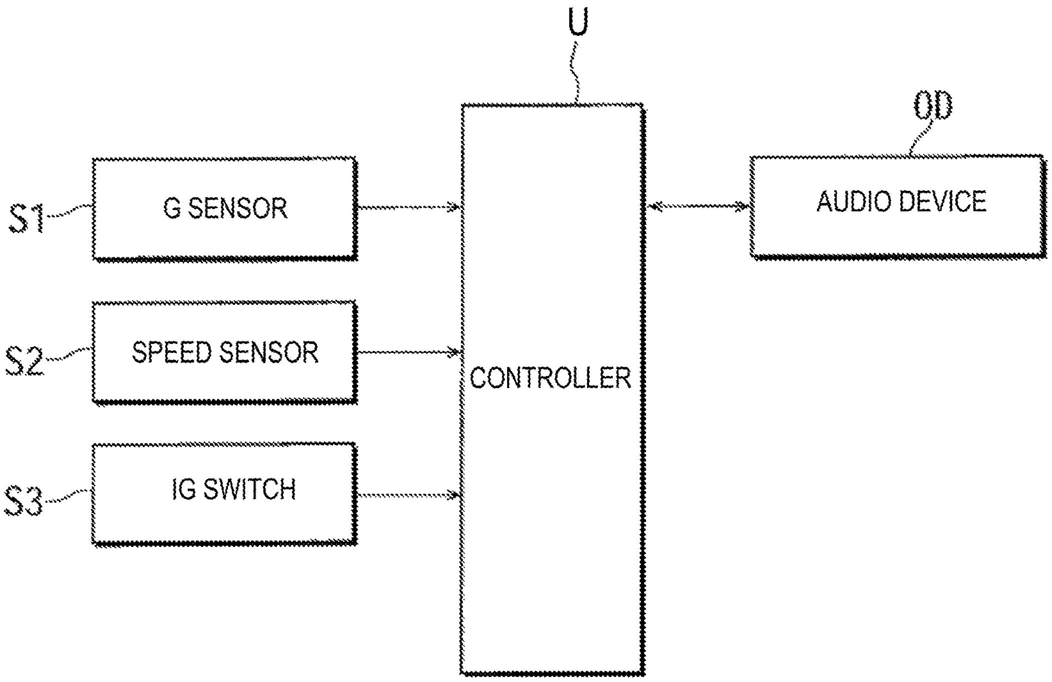
FIG. 6 is a view illustrating one example of a control system for changing the localized position of the audio sound.

FIG. 6 illustrates an example of a control system when changing the second position T2. In FIG. 6, the reference character "U" is a controller configured by a microcomputer and performs a positional instruction for the second position T2 to the audio device OD of FIG. 5. This controller U receives signals from sensors or switch S1 to S3. "S1" is a G sensor (i.e., an accelerometer) that detects g-forces which act on the vehicle body (accelerations and decelerations in the longitudinal and lateral directions). "S2" is an engine speed sensor which detects the engine speed. "S3" is an ignition switch. Any one or more of the sensors and/or switch S1 to S3 may be referred to as the traveling state detector.

Figure 7:
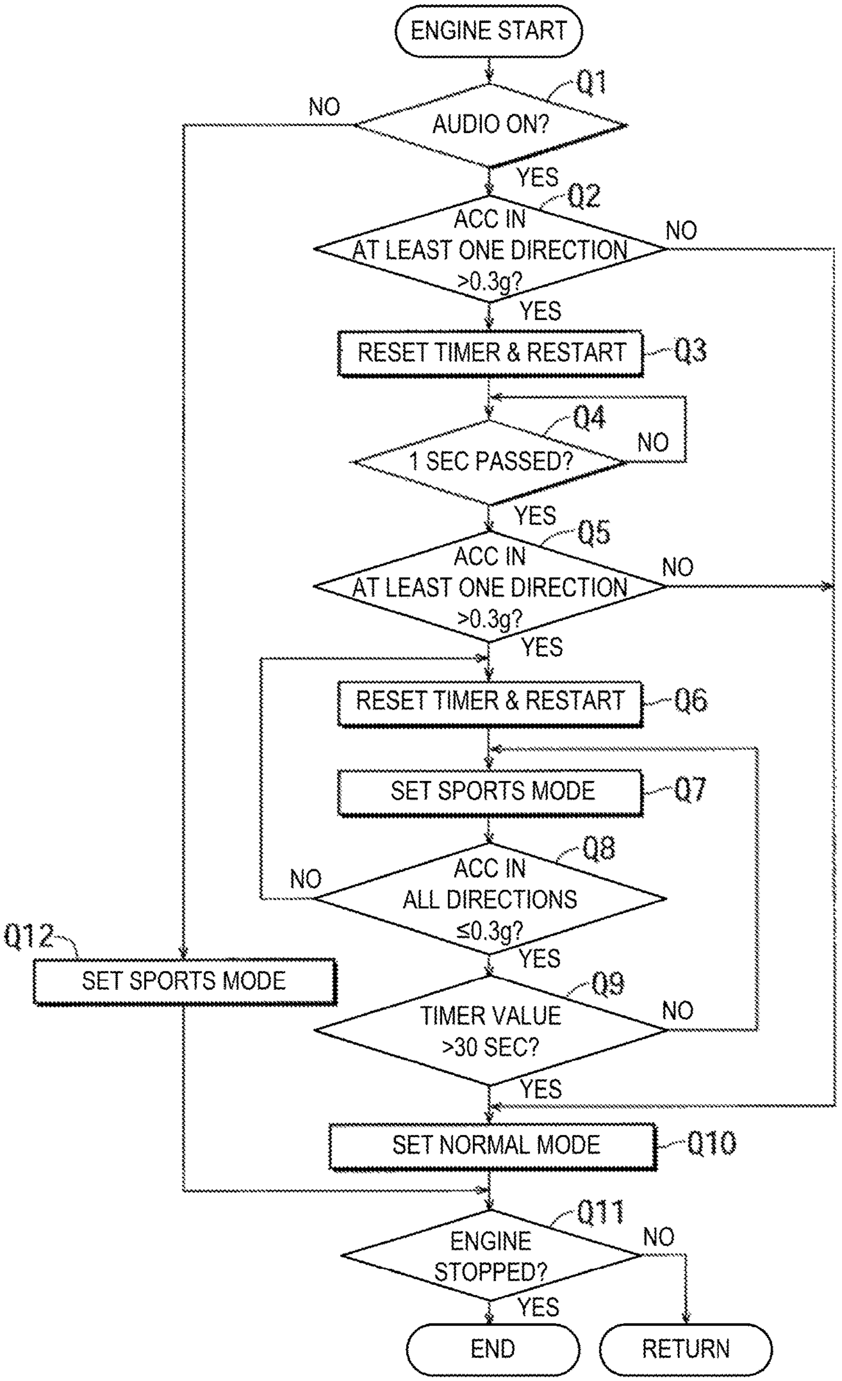
FIG. 7 is a flowchart illustrating a control example for changing the localized position of the audio sound.

Next, a control example executed by the controller U is described while referring to the flowchart of FIG. 7. Hereinafter, "Q" indicates steps, and the given traveling condition for moving the second position T2 from the default position is that at least one of the lateral acceleration and the longitudinal acceleration which act on the vehicle body is higher than a given preset value. Moreover, the control of FIG. 7 is started when the ignition switch S3 is turned on. Further below, a normal mode indicates that the second position T2 which is the localized position of the audio sound is at the default position illustrated in FIG. 4. Furthermore, a sports mode indicates that the second position T2 is moved (changed) from the default position, in a direction away from the first position T1.

First at Q1, whether the audio device OD is ON is determined. If the result of Q1 is YES, at Q2, whether at least one of the longitudinal acceleration and the lateral acceleration is higher than the given value (e.g., 0.3 g) is determined. If the result of Q2 is YES, at Q3, a timer is reset to an initial value 0 and starts counting again. Then at Q4, whether a given short period of time (1 second in this embodiment) has passed since a larger acceleration than the given value is detected, is determined. If the result of Q4 is NO, the determination at Q4 is repeated.

If the result of Q4 is YES, the same determination as Q2 is performed again at Q5. If the result of Q5 is YES, this means that a large acceleration is continuously (or repeatedly) generated in the short period of time, and the driver is actively driving to enjoy traveling.

If the result of Q5 is YES, at Q6, the timer is reset to 0 and starts counting again. Then at Q7, the sports mode is set and the localized position T2 of the audio sound is moved (changed) from the default position illustrated in FIG. 4, in a direction away from the first position T1.

After Q7, at Q8, whether the longitudinal and lateral acceleration are both equal to or less than the given value (0.3 g in this embodiment) is determined. If the result of Q8 is NO, the process returns to Q6.

If the result of Q8 is YES, at Q9, whether the count value of the timer exceeds a given long period of time (30 seconds in this embodiment) is determined. If the result of Q9 is NO, the process returns to Q7.

If the result of Q9 is YES, this means that the state where the sports mode is not performed is clearly confirmed, and thus at Q10, the mode is changed to the normal mode (the second position T2 is resumed to the default position illustrated in FIG. 4).

If the result of Q1 is NO, at Q12, the sports mode is set (however, the audio sound is not transmitted into the cabin). Note that if the result of Q1 is NO, the process may return to start directly.

If the result of Q2 or Q5 is NO, the flow shifts to Q10.

After Q10 or Q12, at Q11, whether the engine is stopped is determined. If the result of Q11 is NO, the process returns to Q1. On the other hand, if the result of Q11 is YES, the control is terminated.

As is apparent from the above description, in the embodiment of FIG. 7, when the sports mode is set, the sports mode is maintained (a frequent change between the sports mode and the normal mode is reduced) until it is confirmed that the given traveling condition for setting the sports mode remains not satisfied for a given long period of time (30 seconds in the embodiment). In order to prevent or reduce the frequent change between the sports mode and the normal mode, for example, the given value (the value of the acceleration) of Q8 may be set smaller than that of Q2 or Q5 by a given value.

Figure 8:
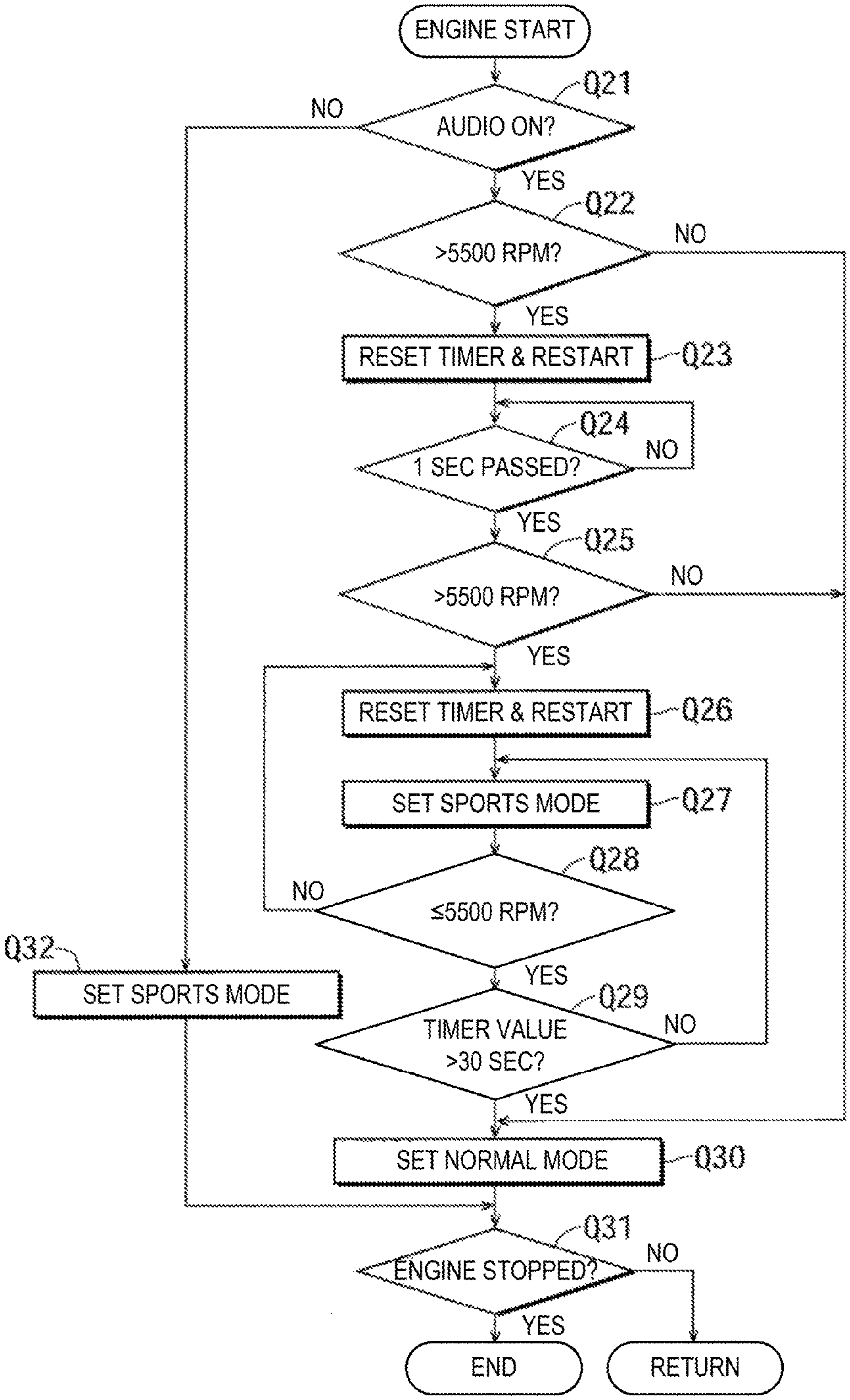
FIG. 8 is a flowchart illustrating another control example for changing the localized position of the audio sound.

FIG. 8 illustrates another control example corresponding to FIG. 7. In this control example, as the given traveling condition, the engine speed is used instead of the acceleration acting on the vehicle body. That is, at Q22 (corresponding to Q2 in FIG. 7), Q25 (corresponding to Q5 in FIG. 7), and Q28 (corresponding to Q8 in FIG. 7), whether the engine speed is higher than (or equal to or lower than) a given speed (5,500 rpm in this embodiment) is determined. That is, in this embodiment, a highest allowable engine speed is set to about 7,500 rpm, and the engine speed of 5,500 rpm as the given value is set as a high speed which is lower than the highest allowable speed by a given amount (around a speed at which a highest output or the highest torque is generated). The control of FIG. 8 is only different from the control in FIG. 7 in that the engine speed is used instead of the acceleration, therefore redundant descriptions are omitted.

Further, the switching between the sports mode and the normal mode may be performed according to an accelerator opening, and in this case, the sports mode may be set when the accelerator opening is large (above a given opening), and the normal mode may be set when the accelerator opening is small.

Although the embodiment is described above, the present disclosure is not limited to the embodiment, and suitable changes are possible within the range described in the claims. The first position T1 may be set suitably, for example, the first position T1 may be set at a lower position than the second position T2 (e.g., the first position T1 is set at a position in or lower than an upper surface of the instrument panel 11, while the second position T2 is set at a position higher than the upper surface of the instrument panel 11). Moreover, the first position T1 may be set at a position on the driver side than the center part of the vehicle in the width directions (since the engine sound is more important information to the driver than the front passenger). The number of speakers may be selected suitably, e.g., six or more, and the disposed positions thereof may also be selected suitably, e.g., dispose some of the speakers in the instrument panel 11.

The audio sound may be not localized (so that the audio sound is hearable from the entire range of wide surroundings or from respective installation positions of a plurality of speakers) depending on the situation (when particularly emphasizing the engine sound). The second position alarm sound may include a rev limiter sound that notifies the engine speed reaching an upper limit. The localized position of the alarm sound is suitably changeable, but it is preferably different from that of the engine sound or the audio sound. Alternatively, the alarm sound may not be localized. Similarly, the exhaust sound may not be localized. The present disclosure is not limited to be applied to the convertible but is also applicable to various types of vehicles, such as a sedan type, a sport utility vehicle (SUV) type, and a four-wheel drive vehicle. The application may also be to a vehicle in which the transmission 31 is disposed in the rear part of the vehicle (at the position of the differential 40), a front-wheel drive vehicle having no propeller shaft 41 (i.e., a front-engine, front-wheel-drive (FF) vehicle), or a vehicle in which the engine 30 is disposed rearward of the cabin. It is needless to say that the purpose of the present disclosure is not limited to what is explicitly described, but also implicitly includes providing what is expressed as substantially preferable or advantageous.

The present disclosure is preferable for distinguishing the engine sound and the audio sound from each other and more clearly recognizing the engine sound as needed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

T1: Localized Position of Engine Sound
T2: Localized Position of Audio Sound

T3: Localized Position of Alarm Sound
OD: Audio Device
U: Controller
S1: G Sensor (accelerometer)
S2: Engine Speed Sensor
S3: Ignition Switch
1: Dashboard
2: Engine Bay
3: Cabin
5L, 5R: Side-Door
8: Driver Seat
9: Front Passenger Seat
11: Instrument Panel
11*a*: Opening (For Engine Sound Transmission)
12: Front Windshield
13L, 13R: Front Pillar
20: Floor Panel
21: Tunnel Part
22: Trim Member
23: Kick-up Part
24: Rear Panel
30: Engine
31: Transmission
40: Differential
41: Propeller Shaft
42: Exhaust Passage
43: Muffler
43A: Exhaust Pipe
50: Opening (For Engine Sound Transmission)
51: Film Member
52: Valve Member
60UL, 60UR, 60BL, 60BR: Speaker
70: DSP
71: Sound Source (For Audio)
72: Amplifier
73: Storage (For Alarm Sound)
80: Extra Chamber
81: Duct

What is claimed is:

1. A sound system for a vehicle including an engine and an audio device for an internal space of a cabin, as sound sources disposed at given positions of the vehicle, comprising:
an engine sound localizer that includes at least a communicative opening configured to localize a first sound generated by the engine to cause a vehicle driver inside the cabin to hear the first sound from a first position;
an audio sound localizer that includes at least one speaker configured to localize a second sound generated by the audio device to cause the driver to hear the second sound from a second position;
a traveling state detector configured to detect a traveling state of the vehicle; and
a controller, executed with a microcomputer, configured to cause the audio sound localizer to change, when a given traveling state is detected by the traveling state detector, the second position in a direction away from the first position,
wherein the given traveling state is a traveling state where an operation load on a person in the vehicle increases, and
wherein the first position is located at a front windshield of the vehicle.

2. The sound system of claim 1, wherein the traveling state where the operation load on the person increases is a traveling state where an engine speed exceeds a given speed.

3. The sound system of claim 2, wherein
the first position is set forward of the vehicle driver seated on a driver seat, and
the controller causes the audio sound localizer to move the second position downward of the first position.

4. The sound system of claim 2, wherein
the first position is set forward of the vehicle driver seated on a driver seat, and
the controller causes the audio sound localizer to move the second position toward a front passenger seat side of the first position in width directions of the vehicle.

5. The sound system of claim 1, wherein the traveling state where the operation load on the person increases is a traveling state where a g-force acting on the vehicle exceeds a given value.

6. The sound system of claim 5, wherein
the first position is set forward of the vehicle driver seated on a driver seat, and
the controller causes the audio sound localizer to move the second position downward of the first position.

7. The sound system of claim 5, wherein
the first position is set forward of the vehicle driver seated on a driver seat, and
the controller causes the audio sound localizer to move the second position toward a front passenger seat side of the first position in width directions of the vehicle.

8. The sound system of claim 1, wherein
the first position is set forward of the vehicle driver seated on a driver seat, and
the controller causes the audio sound localizer to move the second position downward of the first position.

9. The sound system of claim 1, wherein
the first position is set forward of the vehicle driver seated on a driver seat, and
the controller causes the audio sound localizer to move the second position toward a front passenger seat side of the first position in width directions of the vehicle.

10. The sound system of claim 1, wherein the traveling state detector is a one or more of an accelerometer, an engine speed sensor, and an ignition switch.

11. The sound system of claim 1, wherein the second position is located at a surface of an instrument panel.

* * * * *